US006853998B2

(12) United States Patent
Biebesheimer et al.

(10) Patent No.: US 6,853,998 B2
(45) Date of Patent: Feb. 8, 2005

(54) CUSTOMER SELF SERVICE SUBSYSTEM FOR CLASSIFYING USER CONTEXTS

(75) Inventors: Debra L. Biebesheimer, Carmel, NY (US); Neal M. Keller, Somers, NY (US); Daniel A. Oblinger, New York, NY (US); Mark E. Podlaseck, New Preston, CT (US); Stephen J. Rolando, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 09/778,378

(22) Filed: Feb. 7, 2001

(65) Prior Publication Data

US 2002/0107843 A1 Aug. 8, 2002

(51) Int. Cl.[7] .............................................. G06F 17/001
(52) U.S. Cl. ................................ 707/101; 707/4; 707/5; 707/6; 707/102
(58) Field of Search ................................ 707/1, 2, 3, 4, 707/5, 6, 7, 8, 9, 10, 100, 101, 102, 104.1, 200, 205

(56) References Cited

U.S. PATENT DOCUMENTS

| | | | |
|---|---|---|---|
| 5,021,953 A | 6/1991 | Webber et al. | |
| 5,237,499 A | 8/1993 | Garback | |
| 5,303,361 A | 4/1994 | Colwell et al. | 707/4 |
| 5,321,833 A | 6/1994 | Chang et al. | 707/5 |
| 5,375,244 A | 12/1994 | McNair | |
| 5,446,891 A | 8/1995 | Kaplan et al. | 707/5 |
| 5,459,636 A | * 10/1995 | Gee et al. | 706/20 |
| 5,524,187 A | 6/1996 | Feiner et al. | 345/419 |
| 5,546,516 A | 8/1996 | Austel et al. | 345/440 |
| 5,600,835 A | 2/1997 | Garland et al. | 707/5 |
| 5,608,899 A | 3/1997 | Li et al. | 707/4 |
| 5,619,709 A | 4/1997 | Caid et al. | 707/2 |
| 5,710,899 A | 1/1998 | Eick | 345/764 |

(List continued on next page.)

OTHER PUBLICATIONS

"The Answer Machine" (Information Services Management) (Industry Trend or Event), by Susan Feldman, Jan. 2000, The Magazine for Database Professionals, 41 pages.

(List continued on next page.)

*Primary Examiner*—Shahid Alam
*Assistant Examiner*—Isaac M. Woo
(74) *Attorney, Agent, or Firm*—Scully, Scott, Murphy & Presser; Daniel P. Morris, Esq.

(57) ABSTRACT

A system and method for classifying user context in a customer self service system that performs resource search and selection and includes a context attribute database comprising types of user contexts and one or more context attributes associated with each user context for processing by the system, and context attribute function database comprising functions for computing values for each context attribute. The classifying system comprises a computing device for receiving a user query and a context vector comprising data associating an interaction state with the user and, processing the query and context vector against data included in the context attribute database and context attribute function database for predicting a particular user context. The classifier populates the user context vector with context parameters specifying a user interaction state for use in a subsequent resource search. The result of this invention is an ability to relieve the user of the nonproductive work of describing their context and the ability to improve the search value by including criteria derived from both data and behaviors in the general population which may be unknown to the user. The system and method is especially applicable for a self service system in a variety of customer self service domains including education, real estate and travel.

27 Claims, 6 Drawing Sheets

U.S. PATENT DOCUMENTS

| | | | |
|---|---|---|---|
| 5,724,567 A | 3/1998 | Rose et al. | 455/4.2 |
| 5,754,939 A | 5/1998 | Herz et al. | 707/100 |
| 5,768,578 A | 6/1998 | Kirk et al. | 707/100 |
| 5,787,422 A | 7/1998 | Tukey et al. | 707/5 |
| 5,794,178 A | 8/1998 | Caid et al. | 707/532 |
| 5,802,515 A | 9/1998 | Adar et al. | |
| 5,826,260 A | 10/1998 | Byrd, Jr. et al. | 707/5 |
| 5,841,437 A | 11/1998 | Fishkin et al. | 345/346 |
| 5,850,531 A | 12/1998 | Cox et al. | 345/349 |
| 5,918,217 A | 6/1999 | Maggioncalda et al. | 705/36 |
| 5,930,501 A | 7/1999 | Neil | 345/700 |
| 5,956,707 A | 9/1999 | Chu | |
| 5,974,412 A | 10/1999 | Hazlehurst et al. | 707/3 |
| 5,999,927 A | 12/1999 | Tukey et al. | 707/5 |
| 6,006,221 A | 12/1999 | Liddy et al. | |
| 6,009,422 A | 12/1999 | Ciccarelli | |
| 6,012,053 A | 1/2000 | Pant et al. | |
| 6,012,067 A * | 1/2000 | Sarkar | 707/103 R |
| 6,014,661 A | 1/2000 | Ahlberg et al. | 707/3 |
| 6,097,386 A | 8/2000 | Bardon et al. | 345/333 |
| 6,105,023 A | 8/2000 | Callan | 707/5 |
| 6,134,541 A | 10/2000 | Castelli et al. | |
| 6,173,287 B1 | 1/2001 | Eberman et al. | |
| 6,226,408 B1 | 5/2001 | Sirosh | |
| 6,256,633 B1 | 7/2001 | Dharap | |
| 6,282,540 B1 | 8/2001 | Goldensher et al. | |
| 6,327,590 B1 * | 12/2001 | Chidlovskii et al. | 707/5 |
| 6,347,313 B1 | 2/2002 | Ma et al. | |
| 6,442,526 B1 | 8/2002 | Vance et al. | |
| 6,490,577 B1 * | 12/2002 | Anwar | 707/3 |
| 6,502,091 B1 * | 12/2002 | Chundi et al. | 707/4 |
| 6,513,031 B1 | 1/2003 | Fries et al. | |
| 6,519,586 B2 | 2/2003 | Anick et al. | |
| 6,578,037 B1 * | 6/2003 | Wong et al. | 707/10 |
| 2001/0051958 A1 | 12/2001 | deVries et al. | |
| 2002/0129015 A1 | 9/2002 | Caudill et al. | |
| 2003/0018632 A1 | 1/2003 | Bays et al. | |

OTHER PUBLICATIONS

Billsus, D., et al., "A learning agent for wireless news access," Proceedings of IUI 2000: International Conference on Intelligent User Interfaces, ACM, Jan. 9–12, 2000, pp. 33–36, XP–002205011.

Olsen, K., et al., "Visualization of a Document Collection: The Vibe System", Information Processing & Management, Elsevier, Barking, GB, vol. 29, No. 1, 1993, pp. 69–81, XP 000574984.

Mladenic, D, "Text–learning and related intelligent agents: a survey", IEEE Intelligent Systems, IEEE, vol. 14, No. 4, Jul. 1999, pp. 44–54, XP–002205012.

Göker, A., "Capturing Information Need by Learning User Context", 16th International Joint Conferent in Artificial Intelligence: Learning About User Workshop, Jul. 31, 1999, pp. 21–27, XP–002205013.

Anonymous, "Taxonomized Web Search", IBM Technical Disclosure Bulletin, IBM Corp. New York, US, vol. 40, No. 5, May 1, 1997, pp. 195–196, XP–002133594; and.

Davies, J., et al., "Knowledge Discovery and Delivery", British Telecommunications Engineering, London, GB, vol. 17, No. 1, Apr. 1, 1998, pp. 25–35, XP–000765546.

* cited by examiner

FIG. 3

| | EDUCATION (EX: ENVIRONMENT) ←60 | EDUCATION (EX: SUBJECT MATTER) ←70 | REAL ESTATE ←80 | TRAVEL ←90 |
|---|---|---|---|---|
| USER QUERY | LEARN LOTUS NOTES AT HOME  61 | BECOME A LINUX DEVELOPER BY JUNE  71 | FIND HOUSING NEAR NEW JOB BY AUGUST  81 | PLAN A TRIP TO VERMONT IN JUNE  91 |
| USER CONTEXT | CORP EXEC AT HQ REMOTE STAFFIE COMMUTING TECHIE TRAVELING CONSULTANT  62 | CORP EXEC AT HQ REMOTE STAFFIE COMMUTING TECHIE TRAVELING CONSULTANT  72 | RELOCATING BUSINESS PROFESSIONAL EMPTY NESTER COLLEGE STUDENT  82 | SINGLE MOM W/KIDS SWINGING SINGLES BUSINESS TRAVELER  92 |
| CONTEXT ATTRIBUTE | CONNECTIVITY LEARNING MODE(S) TECHNICAL FIELD  63 | CONNECTIVITY LEARNING MODE(S) TECHNICAL FIELD  73 | MODE OF COMMUTE TO WORK/SCHOOL MODE OF HOUSING MAINTENANCE STYLE  83 | MODE OF TRANSPORTATION MODE OF HOUSING FOOD STYLE  93 |
| ATTRIBUTE VALUE | LAN CONNECTED DIAL UP DSL DISCONNECTED  64 | SECURITY GRAPHICAL INTERFACES PROGRAMMING SYSTEMS INTEGRATION  74 | CAREFREE LIVING SUBCONTRACT IT ALL DO-IT-YOURSELF-ER  84 | DRIVE FLY TRAIN  94 |
| VALUE RESOURCE PARAMETERS | INCLUDE: DOWNLOAD & PLAY RESOURCES --- EXCLUDE: ON LINE COLLABORATIVE RESOURCES  65 | INCLUDE KDE --- EXCLUDE GNOME  75 | INCLUDE WALLS INCLUDE PAINT INCLUDE LAWN MOWING --- EXCLUDE PLUMBING EXCLUDE ELECTRICAL EXCLUDE LANDSCAPING  85 | INCLUDE ALL MAJOR CARRIERS --- EXCLUDE PROP PLANES EXCLUDE BAD SAFETY RECORDS  95 |
| RESOURCE SELECTION CRITERIA & VALUES | COST TIME QUALITY RISK  66 | COST TIME QUALITY RISK  76 | COST TIME QUALITY RISK  86 | COST TIME QUALITY RISK  96 |

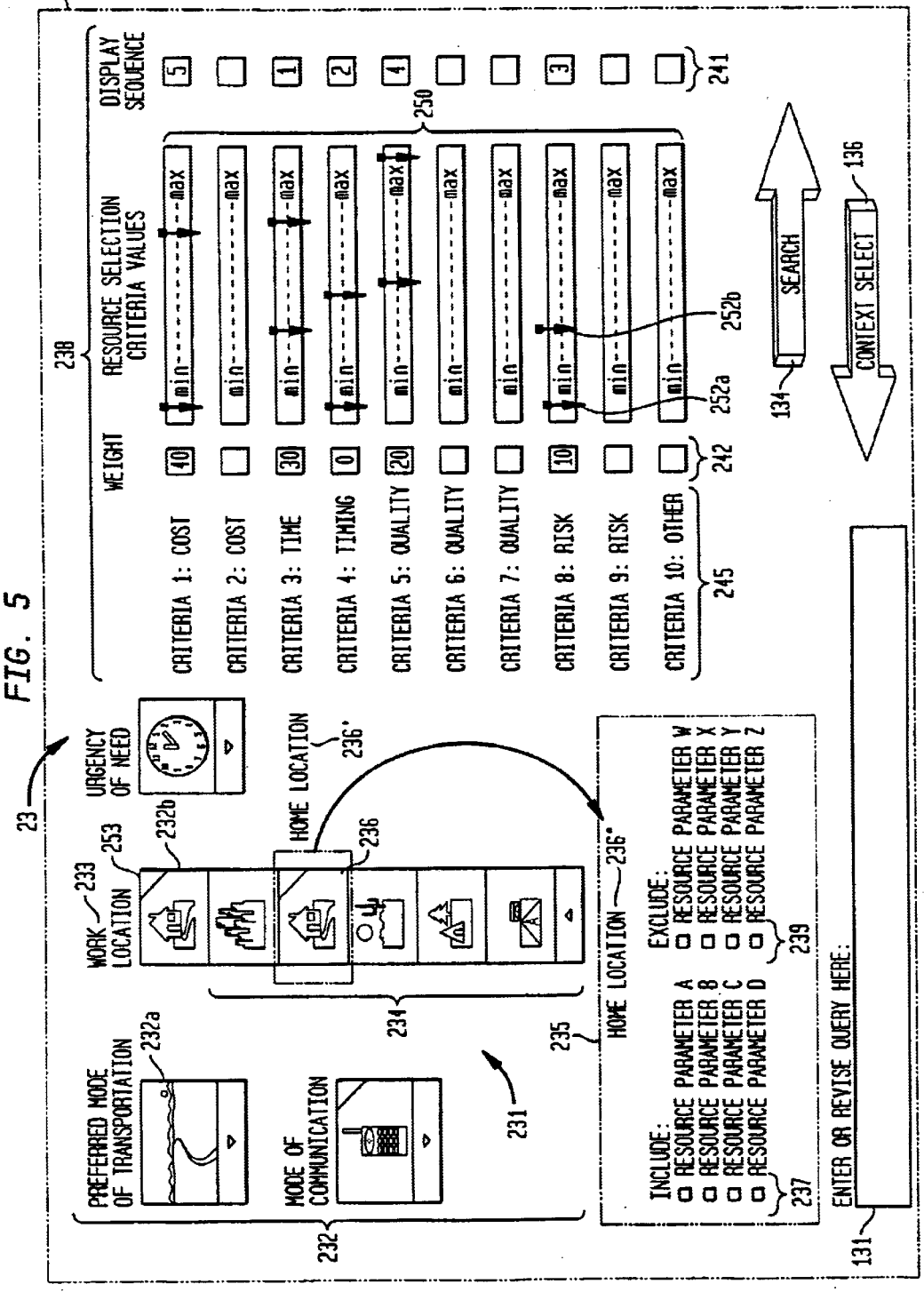

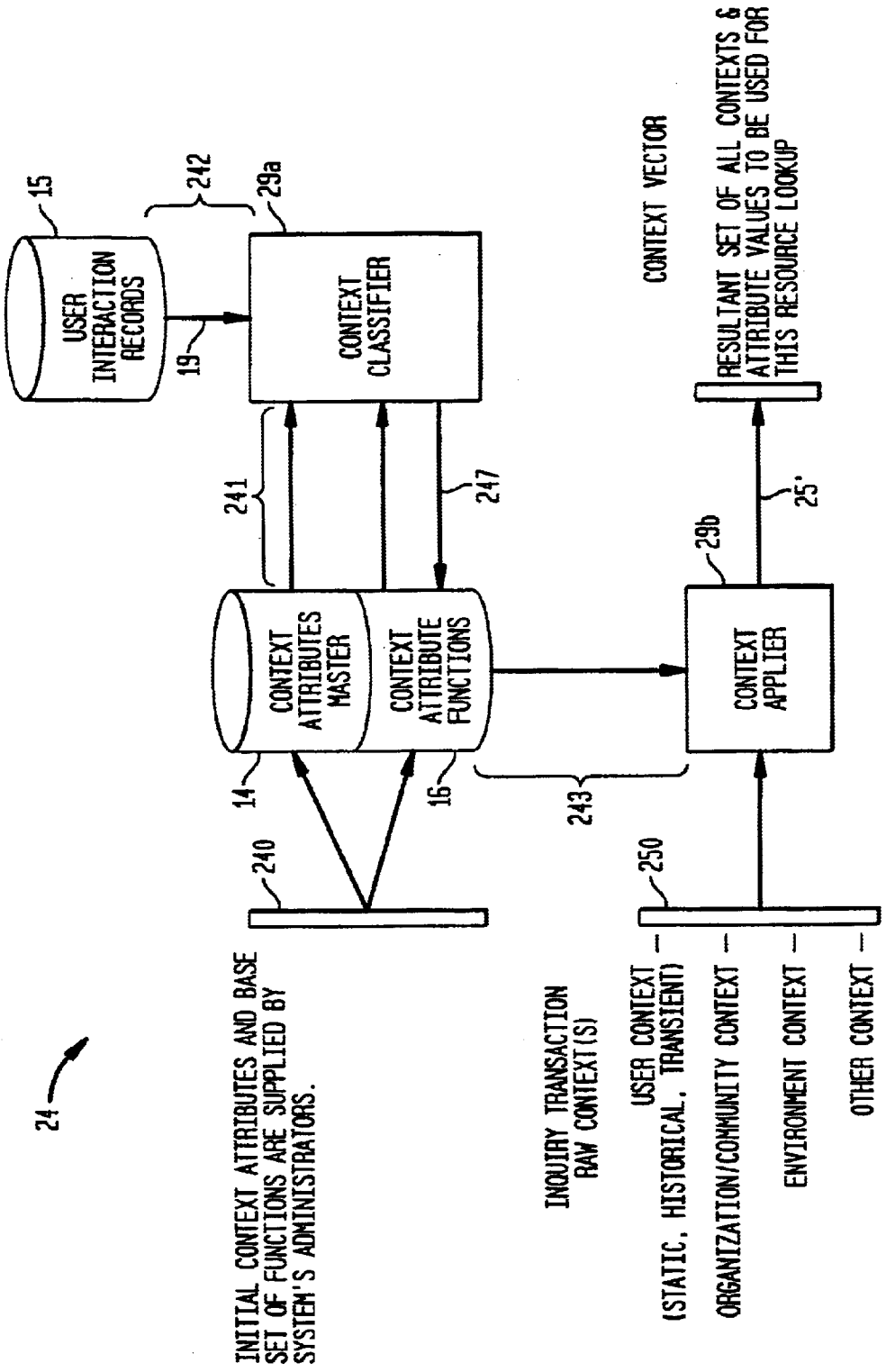

CUSTOMER SELF SERVICE SUBSYSTEM FOR CLASSIFYING USER CONTEXTS

BACKGROUND OF THE INVENTION

1. Field of the Invention

This invention relates generally to the field of customer self service systems for resource search and selection, and more specifically, to a novel mechanism for classifying user contexts for facilitating a more focused search and improving the relevance of query results for such a system.

2. Discussion of the Prior Art

Currently there exist many systems designed to perform search and retrieval functions. These systems may be classified variously as knowledge management systems, information portals, search engines, data miners, etc. However, providing effective customer self service systems for resource search and selection presents several significant challenges. The first challenge for current systems with query capability is that serving queries intelligently requires a large amount of user supplied contextual information, while at the same time the user has limited time, patience, ability and interest to provide it. The second challenge is that searching without sufficient context results in a very inefficient search (both user time and system resource intensive) with frequently disappointing results (overwhelming amount of information, high percentage of irrelevant information). The third challenge is that much of a user's actual use and satisfaction with search results differ from that defined at the start of the search: either because the users behave contrary to their own specifications, or because there are other contextual issues at play that have not been defined into the search.

The prior art has separately addressed the use of the history of interaction with the user or their current service environment to provide context for a resource search and selection system. The prior art also assumes the shallow context of a single user query stream focused on a single topic. A major limitation of these approaches is that they burden the user with providing substantial contextual information and, further that these systems are unable to apply specific user context to improve resource selection for other users on the same subject.

As will be hereinafter explained in greater detail, some representative prior art search and retrieval systems include U.S. Pat. No. 5,974,412 entitled "Intelligent Query System for Automatically Indexing Information in a Database and Automatically Categorizing Users"; U.S. Pat. No. 5,600,835 entitled "Adaptive Non-Literal Text String Retrieval"; and U.S. Pat. No. 5,794,178 entitled "Visualization of Information Using Graphical Representations of Context Vector Based Relationships and Attributes".

U.S. Pat. No. 5,974,412 describes an adaptive retrieval system that uses a vector of document and query features to drive the retrieval process. Specifically described is an Intelligent Query Engine (IQE) system that develops multiple information spaces in which different types of real-world objects (e.g., documents, users, products) can be represented. Machine learning techniques are used to facilitate automated emergence of information spaces in which objects are represented as vectors of real numbers. The system then delivers information to users based upon similarity measures applied to the representation of the objects in these information spaces. The system simultaneously classifies documents, users, products, and other objects with documents managed by collators that act as classifiers of overlapping portions of the database of documents. Collators evolve to meet the demands for information delivery expressed by user feedback. Liaisons act on the behalf of users to elicit information from the population of collators. This information is then presented to users upon logging into the system via Internet or another communication channel.

U.S. Pat. No. 5,600,835 describes a method and system for selectively retrieving information contained in a stored document set using a non-literal, or "fuzzy", search strategy, and particularly implements an adaptive retrieval approach. A text string query is transmitted to a computer processor, and a dissimilarity value Di is assigned to selected ones of stored text strings representative of information contained in a stored document set, based upon a first set of rules. A set of retrieved text strings representative of stored information and related to the text string query is generated, based upon a second set of rules. Each of the retrieved text strings has an associated dissimilarity value Di, which is a function of at least one rule Rn from the first set of rules used to retrieve the text string and a weight value wn associated with that rule Rn. The retrieved text strings are displayed preferably in an order based on their associated dissimilarity value Di. Once one or more of the retrieved text strings is chosen, the weight value wn associated with at least one rule of the first set of rules is adjusted and stored.

U.S. Pat. No. 5,794,178 describes a system and method for automatically generating context vectors representing conceptual relationships among information items by quantitative means for use in storage and retrieval of documents and other information items and for displaying them visually to a user. A neural network operates on a training corpus of records to develop relationship-based context vectors based on word proximity and co-importance using a technique of "windowed co-occurrence". Relationships among context vectors are deterministic, so that a context vector set has one logical solution, although it may have a plurality of physical solutions. No human knowledge, knowledge base, or conceptual hierarchy, is required. Summary vectors of records may be clustered to reduce searching time, by forming a tree of clustered nodes. Once the context vectors are determined, records may be retrieved using a query interface that allows a user to specify content terms, Boolean terms, and/or document feedback. Thus, context vectors are translated into visual and graphical representations to thereby provide user visualization of textual information and enable visual representations of meaning so that users may apply human pattern recognition skills to document searches.

It would be highly desirable to provide for a customer self service system, a mechanism that applies user context for the purpose of more efficient resource dispersion.

It would be further highly desirable to provide a mechanism for a customer self service system that applies user context for the purpose of more efficient resource dispersion and, that improves the relevance of search results for a given user in their current context without requiring the user to explicitly train the system.

It would be highly desirable to provide for a customer self service system, a mechanism that is able to improve the search value by including criteria derived from both data and behaviors in the general population which may be unknown to the user.

SUMMARY OF THE INVENTION

It is an object of the present invention to provide for a customer self service system a mechanism that applies user context for the purpose of more efficient resource dispersion.

It is a further object of the present invention to provide for a customer self service system, a mechanism that applies user context for the purpose of more efficient resource dispersion and, that improves the relevance of search results for a given user in their current context without requiring the user to explicitly train the system.

It is another object of the present invention to provide supervised machine learning to a set of historical user interaction records to classify context attributes that are relevant for this user of the system.

According to the invention, there is provided a system and method for classifying user context in a customer self service system that performs resource search and selection and includes a context attribute database comprising types of user contexts and one or more context attributes associated with each user context for processing by the system, and context attribute function database comprising functions for computing values for each context attribute. The classifying system comprises a computing device for receiving a user query and a context vector comprising data associating an interaction state with the user and, processing the query and context vector against data included in the context attribute database and context attribute function database for predicting a particular user context. The classifier populates the user context vector with context parameters specifying a user interaction state for use in a subsequent resource search.

The result of this invention is an ability to relieve the user of the nonproductive work of describing their context and the ability to improve the search value by including criteria derived from both data and behaviors in the general population which may be unknown to the user.

Advantageously, such a system and method of the invention is applicable for a customer self service system in a variety of customer self service domains including education, real estate and travel.

BRIEF DESCRIPTION OF THE DRAWINGS

Further features, aspects and advantages of the apparatus and methods of the present invention will become better understood with regard to the following description, appended claims, and the accompanying drawings where:

FIG. 3 provides examples of data elements from the education, real estate and travel domains given example user interactions with the customer self service system via the iconic interfaces of the invention.

FIG. 5 illustrates the second Graphical User Interface 22 including the Detail Specification Workspace 23.

FIG. 6 is a flowchart showing the steps of control flow for the Classifying User Contexts sub-process according to the preferred embodiment of the invention.

DETAILED DESCRIPTION OF THE PREFERRED EMBODIMENTS

Figure 1:
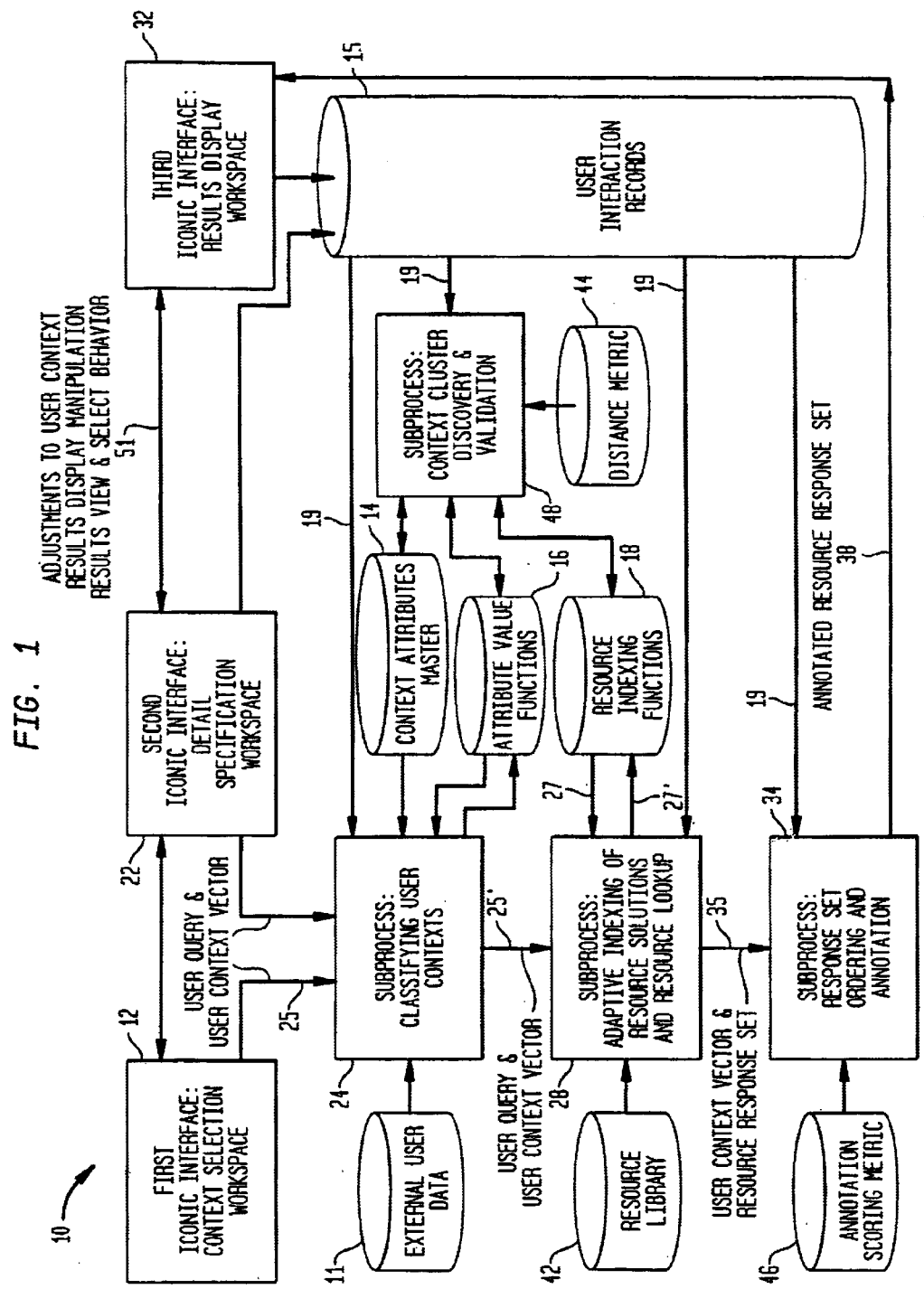
FIG. 1 is a flowchart showing the steps of the control flow between the component inventions included in the generic preferred embodiment of the system invention.

FIG. 1 illustrates a customer self service system ("system") 10 which is described in detail commonly-owned, co-pending U.S. patent application Ser. No. 09/778,146 entitled CUSTOMER SELF SERVICE SYSTEM FOR RESOURCE SEARCH AND SELECTION the contents and disclosure of which are incorporated by reference as if fully set forth herein. The system 10 is a comprehensive self service system providing an end-to-end solution that integrates the user and system, the content and context, and, the search and result so that the system may learn from each and all users and make that learning operationally benefit all users over time. The present invention comprises a particular aspect of this system that focuses on improving the relevance of search results for a given user in their current context without requiring the user to explicitly train the system.

Particularly, as shown in FIG. 1, the self service system provides a three-part intuitive iconic interface comprising interface components 12, 22 and 32 for visualizing and exploring the set of resources that the system has found to match the user's initial query and related subject and context variables. The system 10 preferably enables the expression of a user's context as part of the query and expresses the relevance of the results to a particular user via the interface in terms beyond that of the results' content. The resource set is presented to the user in a way which clearly illustrates their degree of fit with the user's most important context variables, as indicated by their prior usage of the system, as well as by context choices for the current query. The system displays the resources in the sequence specified by the user and enables the user to select and weight the criteria to be used in interpreting and selecting between resources. This provides a shifting of the user's focus from finding something, to making choices among the set of resources available. Via the interface components 12, 22 and 32, the user may redefine their query, preview some or all of the suggested resources or further reduce, and redisplay the response set to extract those with the best degree of fit with that user's current needs. The system generates and displays via the interface a listing of the currently active inclusionary and exclusionary content filters and provides a means for modifying them. More specifically, the intuitive user interface of the invention enables users to specify the variables of their resource needs.

Figure 2:
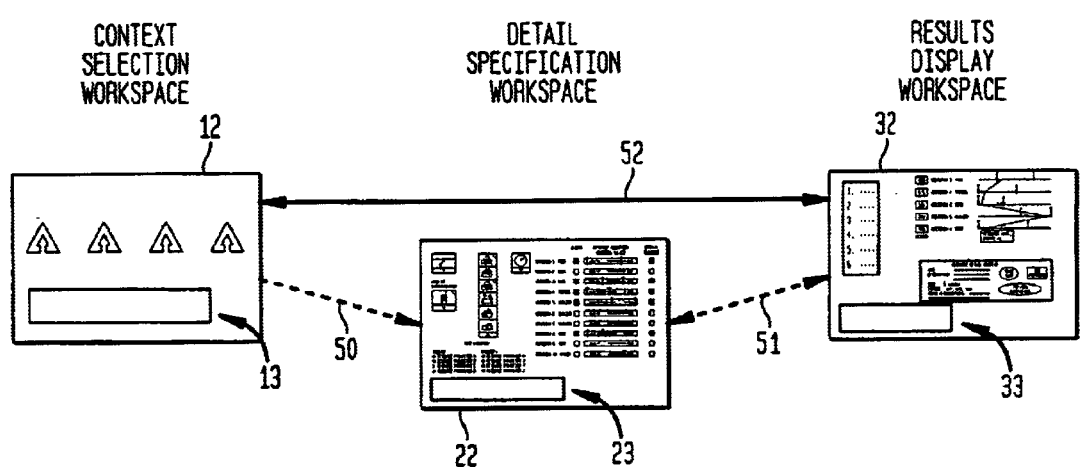
FIG. 2 is a flowchart showing the generic process steps of the user's interaction with the customer self service system through the iconic interfaces of the preferred embodiment of the invention.

FIG. 2 particularly depicts reduced-size displays illustrating the three iconic user interfaces 12, 22, 32 which comprise the respective workspaces according to the invention. As will be described in greater detail herein, the first graphical user interface 12 comprises an initial Context Selection Workspace 13 that enables the expression of user context as part of a query in a manner optimized for ease of use; the graphical user interface 22 shown in FIG. 2 provides a Detailed Specification Workspace 23 including a visual representation of multi-dimensional data for expressing query and results that enables users to completely manage their search in a manner optimized for simplicity and clarity of logic; and, the graphical user interface 32 is directed to a Results Display Workspace 33 that enables expression of relevance of results in terms of user context in a manner optimized to facilitate resource selection using user supplied decision criteria. Aspects of interfaces 12, 22 and 32 shown in FIG. 2 are described in greater detail in commonly-owned, co-pending U.S. patent application Ser. No. 09/778, 136 entitled CUSTOMER SELF SERVICE ICONIC INTERFACE FOR PORTAL ENTRY AND SEARCH SPECIFICATION and additionally in commonly-owned, co-pending U.S. patent application Ser. No. 09/778,147 entitled CUSTOMER SELF SERVICE ICONIC INTERFACE FOR RESOURCE SEARCH RESULTS DISPLAY AND SELECTION the contents and disclosure of each of which are incorporated by reference as if fully set forth herein.

Referring back to FIG. 1, there is depicted a conceptual control flow 10 for the customer self service resource search and selection system according to a preferred embodiment. Via the three-part intuitive graphic user interface (GUI) users are enabled to enter queries and manipulate the system's responses according to their resource needs. Behind the scenes, as will be described, is a set of sub-system components that cooperate to derive, assume, sense and infer particular user contexts with minimal user effort. These components include databases such as: 1) a Context Attributes Master database 14 which stores the definitions of all the attributes known to the system and their relationships to predefined user contexts; 2) an Attribute Value Functions database 16 which stores the definitions and logic associated with assigning a value to an attribute for specific instances (context default, groups of users); 3) a Resource Indexing Functions database 18 which stores the definitions and logic for mapping specific resources to specific context sets; and, 4) a historical User Interaction Records database 15 which stores the users' prior queries, responses, and interactions with the system 10. The first three databases are created before system startup and the User Interaction Records 15 is created with the first user/use of the system, however, it is understood that all four databases are maintained and enhanced through system operations described below.

First, prior to a user signing on to the system, and before the user first views the iconic interface 12, the system 10 performs several pre-processing steps including: 1) creating of an empty "user context vector" 25 and populating the context vector with minimal information from external data elements 11 integrated with the system or, from system sensing/discovery; and, 2) processing the minimal user context vector 25 against the Context Attributes database 14, the Attribute Value Functions database 16, and the User Interaction Records database 15 using context classification logic to result in a "suggestion" that this particular user may be classified into one of a small number of user context definitions from the system's predefined long list of context definitions. After these pre-processing steps, the first iconic interface 12 is then displayed for the user at the user's terminal, or web-browser, in the case of resource searches conducted over a web-based communication link. The iconic Context Selection Workspace 13 initially displays a small set of User Context Icons it has determined are most appropriate, captures the user's selection of the one that seems most fitting for the current user search session, and captures the user's actual query. In most cases, this minimal entry will suffice to begin the search because the system has already determined the relevant attributes, default values and parameters to drive the system forward through the user search without any additional entry on the user's part. However, if the user wishes to review their defaults or to fine tune some context or resource variables, there is an option to proceed to the iconic Detailed Specification Workspace display 22 before starting the search.

Regardless of the screen navigation path chosen, when the user initiates the query, the system 10 packages the user query with a detailed User Context Vector 25 summarizing what is known of the user's needs at this point. Once the search is initiated, the query and context vector are processed sequentially through three distinct sub-processes: 1) a Classifying User Contexts sub-process 24 according to the invention; 2) an Adaptive Indexing of Resource Solutions and Resource Lookup sub-process 28; and, 3) a Response Set Ordering and Annotation sub-process 34.

Particularly, the Classifying User Contexts sub-process 24, receives as input the user query and the raw context vector 25 and External User Data 11, and processes these against the User Interaction records 19 for this user/user group, data from the Context Attributes Master 14 and Attribute Value Functions 16. The system classifies this specified user interaction state and annotates the context vector 25' with a complete set of context parameters for use in subsequent processing. The Classifying User Contexts sub-process 24 particularly applies an inductive learning algorithm as an attempt to predict derived contexts. Additionally, the Classifying User Contexts sub-process 24 updates the Attribute Value Functions database 16 with more enhanced functions.

FIG. 6 illustrates the specific control flow of the Classifying User Contexts sub-process 24 according to the present invention, and particularly, the methodology implemented for classifying a specified user interaction state and annotating it with a complete set of context parameters for use in the ensuing search processes. According to the invention, the term "context" includes a very broad range of "attribute—value pairs" which describe a user, including, but not limited to, their knowledge of a customer service domain, their organizational and community contexts, their user environments (including technology capabilities) and other items of static, historical or transient nature.

For the purpose of this invention the terms rule and function are used interchangeably. Both refer to any data structure that can be executed by an interpreter in a way as to compute a set of labeled output values given a set of labeled input values. An example of an arithmetic rule is "Fahrenheit←Centigrade*5/9+32". Rule languages include, but are not limited to: neural nets, decision trees, functional languages, polynomial functions.

To accomplish this task of classifying a specified user interaction state and annotating it with context parameters for use in the ensuing search, three asynchronous operations are executed: 1) a first operation involving periodic data creation and maintenance; 2) a second operation occurring frequently or continuously in the background and involving system learning from historical transactions; and 3) a third operation that occurs when the user initiates or refines a query to the system and necessarily requires both of first and second operations to execute as a prerequisite.

More particularly, in the first operation, 241 the system is supplied with an ever-improving "master" set of context attributes 14 and associated functions 16 for assigning default values to those attributes. Particularly, the context attributes master 14 includes the name of the contexts, their attributes, and the icons for display via the interface (FIG. 2) that represent each context and attribute. The context attribute functions 16 are the software code that computes values for each of the context attributes. For example, when the self service system is implemented in an education capacity or domain, a function may enumerate the list of people in a college or in-house class or, in a more complex example, it may look at the parameters surrounding a user's connectivity to see if it is low or high bandwidth, etc. It is understood that a startup set of attributes and functions 240 relate to operational domains, e.g. education, real-estate, travel, and are initially defined by system administrators and available at system initiation. On an ongoing basis, a sub-process, described in commonly-owned, co-pending U.S. patent application Ser. No. 09/879,454, applies machine learning to the identification of additional contexts and facilitates the system administrator's validation of contexts and creation of newly derived context attributes in the master set 14. In most instances, functions associated with those attributes are automatically generated by a context classifier process 29*a* in the manner described herein. However, this Context Classifier process 29*a* does enable the system administrator to manually input those functions explicitly at the same time as validating the new context attributes proposed by the system.

In the second operation 242, the Context Classifier 29*a* executes as a continuous, iterative, and potentially off-line process, i.e., it is not part of the control flow of processing a specific user query. The Context Classifier 29*a* applies an inductive learning algorithm to attempt to predict derived contexts. Particularly, for a particular domain, the Context Classifier 29*a* analyzes historical user interaction records 19 from the User Interaction Records database 15 to learn how the user, the attributes and the specific values map to Context Attribute functions 16, i.e., the user interaction records 15 serve as a training set for the continuous improvement of the functions. This system learning may be accomplished because the user interaction records contain traces of previous interactions, including user validated contexts that were applicable during those sessions, and the users' response/behaviors around those transactions. Additionally, the Context Classifier 29*a* considers both individual user history and that of other users with shared organization, community or environmental similarities leading to common behaviors and acceptance criteria. The output 247 of this process comprise the additions and modifications to the set of Context Attribute functions 16 resulting in increasing ability to predict derived contexts as functions of the raw contexts.

In the third operation 243, a Context Applier process 29*b* is executed on-line when the user initiates (logs-in) or refines a query to the system. Each user's current inquiry transaction has it's own set of raw contexts (as entered via the iconic interface or sensed in response to the user log-in identification). As shown in FIG. 6, these raw contexts include user context whether it be static, historical, or transient, organizational or community context, environment context, or any other context associated with the user and dependent upon that user's interaction state and query domain, e.g., education, real estate, travel, etc. The Context Attribute functions 16 are used to compute a specific value for each context pair, given the raw context 250 for this particular user transaction. Since the functions are constantly improving, the values computed for each context attribute for each individual user lead to improved accuracy and relevance in the search that follows.

The output of the Context Applier process 29*b* is the Context Vector 25' which holds all the context attributes and values relevant to this search and which is used in the ensuing resource lookup as described in commonly-owned, co-pending U.S. patent application Ser. No. 09/778,135 entitled CUSTOMER SELF SERVICE SUBSYSTEM FOR ADAPTIVE INDEXING OF RESOURCE SOLUTIONS AND RESOURCE LOOKUP, the contents and disclosure of which are incorporated by reference as if fully set forth herein. Importantly, this context vector is kept intact through the completion of the user search, even if later revised, so the system can learn what leads to successful and unsuccessful search conclusions as described in co-pending U.S. patent application Ser. No. 09/778,135.

The Context Applier process 29*b* is additionally invoked at each session initiation for a user's search transaction, using a minimal or null user data set to produce defaults for user context, attributes, values, and resource parameters for the initial display of the interface described in co-pending U.S. patent application Ser. No. 09/778,136. This pre-processing step delivers additional benefits to the user by insuring use of the most current data and functions operating in the system, i.e., the system will determine everything about the user and generate the most up to date context vextor before processing their actual user query. Described below with respect to FIG. 3 are representative examples of a user's interaction with the system in a variety of customer domains including education, real estate and travel. In the representative examples illustrated in FIG. 3, the Context Classifier will initially populate the user context vector with the context attributes and associated values according to a user, for example, in response to user log-in to the system, or subsequently, in response to initial query and context icon selection.

As the customer self service system is provided with functionality enabling a user to "bookmark" their stopping point in a prior session and to resume with a "work-in-process" data set, the initial settings may be modified based upon system discovery or user override at the time of inquiry, resulting in the raw contexts associated with the user's current inquiry transaction. It is this raw context data which serves as input to the Classifying User Contexts sub-process 24.

The Adaptive Indexing of Resource Solutions and Resource Lookup sub-process 28 receives as input the user query and the context vector 25' and processes them against a Resource Library 42, the User Interaction Records for this user/user group 19, and the Resource Indexing Functions 27. This sub-process particularly maps specific contexts to specific resources so as to increase the relevance of search results for a given user in their current context without requiring the user to explicitly train the system. The primary output of the Adaptive Indexing of Resource Solutions and Resource Lookup sub-process 28 is a newly identified Resource Response Set 35 which is input to the Response Set Ordering and Annotation sub-process 34. The Adaptive Indexing of Resource Solutions and Resource Lookup sub-process 28 additionally generates a secondary output which comprises updates to the Resource Indexing Functions database 18 with yet more enhanced functions 27'. Further details regarding the Adaptive Indexing of Resource Solutions and Resource Lookup sub-process 28 may be found in commonly-owned, co-pending U.S. patent application Ser. No. 09/778,135.

The Response Set Ordering and Annotation sub-process 34 receives as input the User Context Vector and Resource Response Set 35 and processes it against data from an Annotation Scoring Metric database 46 and User Interaction Records 19 for the particular user/group. This sub-process 34 weights and ranks the potential responses according to the resource selection criteria specified by the user on the Detailed Specification Workspace described herein, and takes into consideration the scoring metric. The sub-process 34 additionally tags the response set with data elements necessary for display and manipulation on a visualization system, including, but not limited to, the Results Display Workspace 32 described in the co-pending U.S. patent application Ser. No. 09/778,147, and particularly generates as output an Annotated Resource Response Set 38. Further details regarding the Response Set Ordering and Annotation sub-process 34 may be found in commonly-owned, co-pending U.S. patent application Ser. No. 09/778,139, the contents and disclosure of which are incorporated by reference as if fully set forth herein.

As mentioned, the ordered and annotated set of resources that the system has found to best match the user's initial query and related subject and context variables may be utilized to drive a visualization system, including but not limited to, the intuitive iconic interface 32 for visualizing and exploring the response set as will be described in greater detail herein. This Results Display Workspace provides an interface that enables the user to continue working to learn about the resources suggested (detail/preview), narrow their results (selection) or redisplay them in a more meaningful view for decision making (graphically). In most instances, that will suffice. However, should the user wish to further refine their query, tune or override their current or default settings, that option is also available by navigating back to the Detailed Specification Workspace interface 22. If the user needs to start over, including selection of a new user context, it will be necessary to navigate back to the initial Context Selection Workspace 13.

As the user works with the system, particularly through the Results Display Workspace 32 and the Detail Specification Workspace 22 his/her interactions are captured and stored in the User Interaction Records database 15. Thus, in addition to the user query, context vector and response data set, the system retains adjustments to user context, results display manipulation, and results viewing and selection behavior 51.

Having completed the transaction, there is one more sub-process which is essential to this system: the sub-process for Context Cluster Discovery and Validation 48. This batch process, occurring asynchronously and constantly, applies unsupervised (machine) learning to cluster user interaction records and to assist in the identification of new user contexts, attribute value functions and resource indexing functions. The User Interaction Records 19 are processed against the Context Attributes Master database 14, the Attribute Value Functions database 16 and the Resource Indexing Functions database 18 and a Distance Metric 44 which helps determine "how close is close", i.e., "what's good enough" for a variety of factors. When validated by a system administrator, additional user contexts may be implemented (manually or semi-automatically) in the databases and visibly as new icons on the Context Selection Workspace 13.

Attribute value functions may also be identified and resource indexing functions may be discovered and updated in the appropriate files automatically. All of these additional classifications improve the ease of use, accuracy, and predictability of the system over time. Further details regarding the Context Cluster Discovery and Validation sub-process 48 may be found in commonly-owned, co-pending U.S. patent application Ser. No. 09/879,454 entitled CUSTOMER SELF SERVICE SUBSYSTEM FOR CONTEXT CLUSTER DISCOVERY AND VALIDATION, the contents and disclosure of which are incorporated by reference as if fully set forth herein.

The customer self-service system and the interaction with the system through the iconic interfaces of FIGS. 4 and 5, will be described with respect to example domains such as education, travel and real estate, and further will be described from the point of view of the following users: a learner, a traveler and a real estate transactor, e.g., renter/buyer. In describing the user's interaction with the system through the iconic interfaces, a set of data elements used in the system and their characteristics are first defined as follows:

Query: an entry field for entering search data by using text or voice methods, for example, but not limited to these methods User Context: a User Context represents a predefined set of context attributes which are relevant to the search behavior/needs of a group of people.

More particularly, the User Context enables the packaging of a rich set of attributes about the user with a rich set of attributes about their searching and execution environment in response to "one click" of an icon for the user presented via the interface. While there are potentially a large number of potential user contexts for any user population, each individual user would likely settle on a small number that apply to them in different circumstances. The naming of these contexts is important so that the user may recognize him/herself as potentially fitting into that group. The attributes associated with a particular user context are predefined by system administration and cannot be modified by the user. Over time, the system will identify changes to the attribute set that will make a particular user context perform better for its repeated users. Over time the system will detect different attribute sets which appear to predict user needs/behaviors and might suggest new user contexts for the system.

Context Attribute: An attribute is used to describe a characteristic associated with the User Context.

There are potentially an unlimited number of attributes defined to the system with a master list maintained in the Context Attributes Master File. New attributes are discovered and added with system administrator validation. End users may not modify the definition of a context attribute, nor its' packaging into user contexts, nor the list of values associated with each.

Attribute Value: A list of attribute value choices is predefined for each context attribute.

The system sets a default value to each attribute based upon data lookup, sensed, or historically derived from prior user entry or behavior. Either the system or the user may modify the value initially set based upon explicit preferences or observed behavior. This value is added to the context vector used for resource lookup, and is retained in the historical User Interaction Records database 15 so it may be used to set default values for each individual each time they use the system.

Value Resource Parameters: Parameters defined in terms of inclusion and exclusion that may be used as a filter to increase the relevance of the response set.

That is, with the basic search logic established, the user's query may be satisfied. However, the response set may contain a large number of resources which are not satisfactory to this individual. Value Resource Parameters defined in terms of inclusion and exclusion may be used as a filter to increase the relevance of the response set. The inclusionary parameters may be easier to establish by users new to the system and that exclusionary parameters will become more evident as users gain experience in working with the response sets.

Resource Selection Criteria and Value Ranges: Parameters and specifications for ranking a user's response set to enable more informed resource selection.

Thus, even with the degree of specificity enabled by the system, and even with the constant improvement in search relevance/efficiency as it relates to user contexts, there usually may be more than one resource to present to the user (in fact, if the search is too narrow, the user may miss the opportunity to explore/discover different approaches to meeting their actual needs). As most users know (or think they know) the criteria they will apply to selecting between options, a limited set of resource selection criteria are provided by the system (the set would differ by domain). However, via an interactive graphical display provided by the iconic interface of the invention, the user may now specify acceptable value ranges and relative weighting of each criteria for ranking their response set and/or may customize the use of these criteria.

When the actual response set data is offered, most users face the reality of many options, few options, more subjective information about specific resources; and they may make tradeoffs around the selection logic. For example, the response set may be refreshed as the user may decide to eliminate a criteria, change the weight of a criteria, or change the acceptable value ranges for a criteria. From these specifications, accessible via the iconic interface of the invention, the user may determine for example, whether time, timing, flexibility, and risk may be sacrificed in order to bring the cost down below a certain dollar ($) value, and, for example, determine how much more would the user need to pay to get exactly what he/she wants exactly when he/she wants it.

Figure 4:
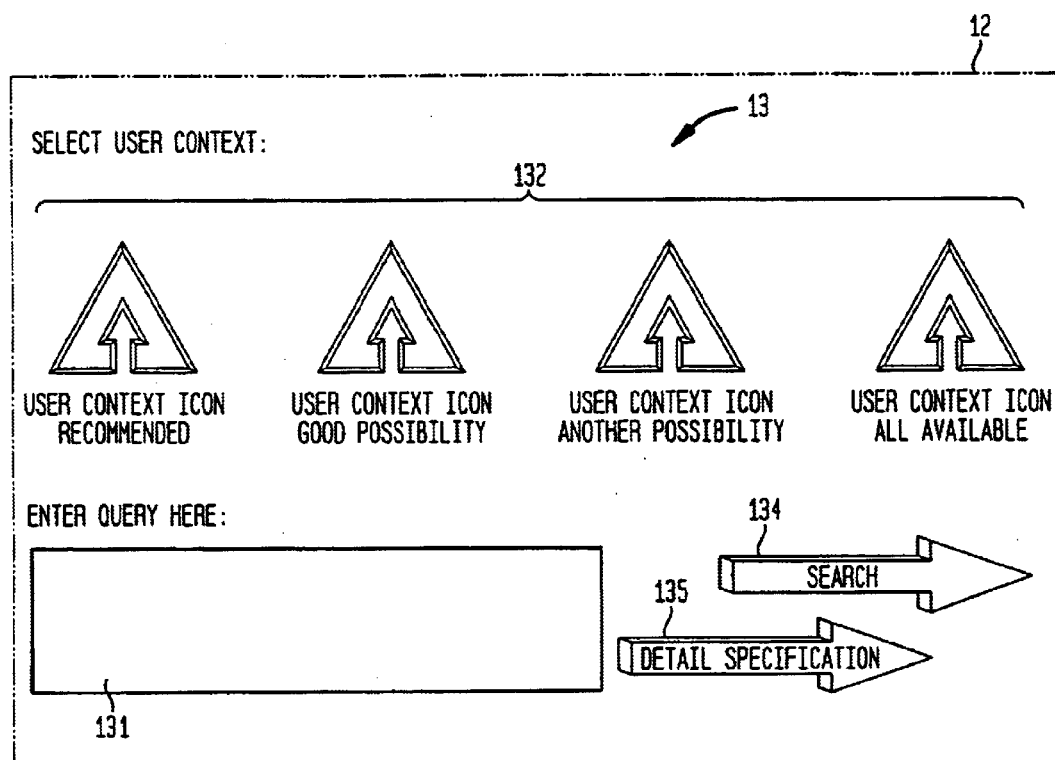
FIG. 4 illustrates the first Graphical User Interface 12 including the Context Selection Workspace 13.

FIGS. 2, 4 and 5 depict in greater detail the iconic interfaces for the customer self service system that enable the use of a rich set of assumed, sensed, inferred, and derived contexts with minimal user effort.

With initial logon, as shown in FIG. 2, the system first presents a set of user contexts which are available to the user via the simplified iconic interface 12 of FIG. 2. The system will suggest one context over the others, but the user may select the one most appropriate to their current situation. In each session, the user selects only one user context to use, however over time each user may discover that a couple of different user contexts serve their needs in differing circumstances. On this screen 13 particularly, the user then enters a query via one or more methods including text via a web browser display interface, for example, or via voice, for example, with help of voice recognition software. It should be understood however, that query entry is not limited to these types of methods. The user will then initiate a lookup and proceed either to a third process step (via most direct path 52) for viewing a search result response set via the Results Display Workspace interface 32, or, proceed to a second step (via path 50) to optionally refine/override search variables via the Detail Specification Workspace interface 22.

FIG. 4 illustrates in detail the first graphical user interface 12 including the initial Context Selection Workspace 13 that enables the expression of user context as part of a query. As shown in FIG. 4, the Context Selection Workspace 13 includes: a series of one or more selectable User Context Icons 132 presented to the user for selecting user contexts; and, a Query Entry Field 131 enabling user entry of search terms via text or voice entry, for example. In accordance with the principles of the invention, the User Context Icons 132 are graphical user interface elements from which the user selects the one context most representative of his/her current situation. The icons presented in this interface each represent a packaging of sets of attribute-value pairs which describe a kind of user in a particular situation. Particularly, a user context represents a predefined set of context attributes which are relevant to the search behavior/needs of a group of users. For example, as described herein, context may include aspects of the user's knowledge, their relationship to organizations and/or communities, their user environment(s), and their resource need. All of these combine to provide a rich context surrounding the actual query which can significantly improve the outcome of the search through resources.

The Context Selection Workspace 13 thus enables the expression of user context as part of the query and is optimized for ease of use. Particularly, the user selects from one or more of the several displayed context icons 132 by clicking on them. A context "applier" pre-process described in commonly-owned, co-pending U.S. patent application Ser. No. 09/778,136 is invoked at each session initiation for a user's search transaction, using a minimal or null user data set to produce defaults for user context, attributes, values, and resource parameters for the initial display of the Context Selection Workspace 13. This pre-processing step delivers additional benefits to the user by ensuring the use of the most current data and functions operating in the system. After making the initial query entry, by selecting hyperlink 134, the user is able to initiate the search and proceed directly to the third interface 32 which displays the actual search results. Alternately, by selecting hyperlink 136, the user may proceed to the second interface 22 having the Detail Specification Workspace 23 for further query editing and/or context refinement.

Returning to FIG. 2, with respect to the second step, the user is able to fine tune or override context attribute values, value resource parameters, and resource selection criteria and value ranges, using a drag and drop interface, iconic pulldowns, and/or slide buttons. The user may return to this screen as many times as needed to find a suitable response set. Particularly, via the second iconic interface 22, the User Context selected in the first step has been made explicit by its default settings on all the iconic interface elements listed. Thus, via a Detail Specification Workspace 23 the user may: 1) modify the query (via text entry or voice, for example); 2) change the value of attributes associated with the user context (using pull down menus); alter the value resource parameters (e.g., include/exclude) using checkboxes; 3) customize the subset of responses by altering the resource selection criteria, including the weighting of criteria and the ordering of criteria on the final display, (e.g., using checkbox and/or numeric entry); and, 4) further refine the selection by specifying minimum/maximum acceptable value ranges for resource selection criteria through drag and drop of "tabs" on sliders, for example. After making the necessary adjustment, the user re-initiates the lookup and may proceed to the third step via path 51.

FIG. 5 illustrates in detail aspects of the second iconic graphical user interface 22 which enables the user to define or change all the parameters associated with their query 131 and (single) selected user context 132. As shown in FIG. 5, the graphical user interface 22 is divided into the following sections: a section for displaying the Query Entry field 131 as entered on the prior interface screen (FIG. 4) and available for editing; a section for displaying navigation arrows which allow the user to proceed with the search 134, or return to the initial Context Selection screen 136 via the first iconic interface to initiate a new query or select a different user context; and, a Detailed Specification Workspace 23 which is where all the search parameters can be explicitly viewed and modified. There are only two things the user cannot change from this screen: the user context selected (which they may change only on the Context Selection screen) and the context attributes which are linked to the user context (and which are predefined in the Context Attributes Master database 14).

As shown in FIG. 5, within the Detailed Specification Workspace 23 there comprises: an Attribute-Value Workspace 231, for enabling the user to change the attribute values for all the context attributes, represented as graphic elements 232, associated with the selected user context icon 132 (FIG. 4); and, a Resource Selection Criteria Workspace 238, for enabling the user to define the criteria 245 to be used in evaluating resources, define minimum and maximum acceptable values provided on slider elements 250 corresponding to each criteria, specify the weight assigned to those criteria via selection boxes 242, and specify the positioning of those criteria in a graphical display of the resources selected via selection boxes 241. As will be described, FIG. 3 provides sample data for the context attribute, attribute value, value resource parameters, and partial resource selection criteria from different domains which may be represented in the Detailed Specification Workspace 23.

With more particularity, the Detailed Specification Workspace 23 additionally includes the Value-Resource Parameter Workspace 235, for enabling the user to change or create resource parameters using include logic 237 or exclude logic 239 for any attribute value 232 selected in the Attribute-Value Workspace 231. More specifically, the Attribute-Value Workspace 231 includes graphical representations of all the context attributes 232 associated with the single (currently active) selected user context 132. Each context attribute 232 is displayed with a text title 233 for the attribute. The currently active attribute value for that context attribute is shown on each context attribute icon. In addition, if the user has substituted, as described below, a context attribute value different than the default value provided for this user session, a marker 253 is displayed on the corner of the context attribute icon. If the user "mouse clicks" on the context attribute element, e.g., icon 232b, the system displays a pull down menu 234 of graphic elements showing all the possible attribute values for this context attribute. If the user "mouses over" any of the values from pull down menu 234, e.g., attribute value 236, a textual description 236' supporting the element may appear. By selecting a context attribute element from the pull down menu 234, e.g., element 236 shown highlighted in FIG. 5, the user is enabled to fine tune their selected context based upon their current situation. If the user "mouse clicks" on a value other than the current default, the new value is "selected" to substitute for the default. If the user "double clicks" on the attribute value, the system prepares the Value-Resource Parameter Workspace 235 for this single attribute value, as will be described. FIG. 3 provides sample data for context attributes and attribute values from different domains which may be represented in the Attribute Value Workspace 231.

In the Value-Resource Parameter Workspace 235, the user may change or create resource parameters using include logic or exclude logic for any context attribute value 232 selected in the workspace 231. Regarding FIG. 5, with more particularity, the Value-Resource Parameter Workspace 235 is displayed for one attribute value at a time and is only displayed when requested via a double click, for example, on one of the attribute values displayed in the attribute Value Workspace 231, e.g., attribute value 236. The Value-Resource Parameter Workspace 235 is a pre-formatted two-column space (dialog box) where the user may establish inclusionary resource filters via checkboxes 237 and/or exclusionary resource filters via checkboxes 239, based upon pre-established resource characteristics 236" for that selected attribute value. The value resource parameter data elements are pre-set by the user's know context, prior history of selecting from resources identified by the system, and potentially by corporate/organizational policy implemented through the system. By making these additional specifications, the user is enabled to increase the relevance of the resource response set based upon their current situation and personal preferences. When finished with these specifications, the user may double click to close this box 235 and return to the Attribute Value Workspace 231. This step can be repeated for as many attribute values as the user would like to refine and may be executed either before or after the search is conducted. Value resource parameter data elements associated with context attribute values for different domains, are provided in FIG. 3 as samples of data which may be represented in this Value-Resource Parameter Workspace 235.

Regarding FIG. 5, with more particularity, the Resource Selection Criteria Workspace 238 includes a list of criteria 245 which may be used in evaluating resources. This list, provided by the system, is customized by domain; but in all domains, it involves criteria including, but not limited to issues such as: cost, time, timing, quality and risk associated with using a particular resource to satisfy the user's specific need. The initial system default might be to use all criteria and weight them equally. Over time, however, the default criteria may be set by the system based upon user context, user prior transaction history and user behavior on prior searches. If the user wishes to further reduce the set of criteria, they may do so by assigning a weight, for example a percentage weight, to each criteria they want used in the entry boxes 242. Along with each of the criteria selected there exists a range of acceptable values specified on an associated individual slider element 250. The initial system default, may be "unlimited" and then, may set over time based upon user context, use and behavior. Additionally, the user may use drag and drop tabs 252a,b on the slider element 250 to set a minimum and/or maximum value for the associated resource selection criteria. It is understood that the unit of measure on the sliders may vary by criteria. Further, via entry boxes 241, the user may select to view via "check" or specify via number entry the display sequence of these criteria when arrayed as the axes on an n-dimensional graphic display provided in the Results Display Workspace via graphic interface 32 as described in commonly owned, co-pending U.S. patent application Ser. No. 09/778,147, or when viewed on another visualization system.

The Detailed Specification Workspace 23 thus provides full disclosure of system defaults and enables the user to completely manage their search.

With respect to the third step, a display of the annotated response set is provided in a form ready for preview or selection as described herein. The user may rework this screen as many times as needed to better understand and make decisions about resource(s) to use. More particularly, via the Results Display Workspace 33 the user may: 1) view the response set, ranked by the aggregate value and weighting as defined by resource selection criteria and value ranges; 2) select one or many of the ranked responses for graphical display in multi-dimensions along the multiple axes of the resource selection criteria; and, 3) initiate a "roll over" of one or more resources from either the ranked list or the graphical display to view detailed descriptions or to "preview" the resource. If there are too many responses, too few, or if they are incorrect, the user may return to the second step to further refine/redefine, and re-execute the lookup. Alternately, the user may return to the first step to choose a different context for their search.

While the system is intended to operate on a fully enabled graphic workstation or personal computer, it is intended that search definition and the results visualization processes described herein may be operated by users of reduced graphics-enabled devices such as text screen workstations, Organizers, or any type of Personal Digital Assistants (PDAs). Accordingly, in alternative embodiments, all the context icons may have names, all the graphical displays may be reduced to lists, all the pull downs may be viewed as indented lists or secondary screens, and all the min-max sliders may convert to fill-in boxes. Further, as mentioned, the customer self service system described herein is applicable to many applications including the domains of education, real estate, and travel. The generic process flow described with respect to FIG. 2, will now be described with specific examples from the education, real estate and travel domains as shown in FIG. 3.

With respect to the education domain, the user is a learner and FIG. 3 depicts an example interaction with the system through the iconic interfaces (FIG. 2) included in the embodiment of the invention as applied to the education domain. The three iconic workspaces of FIG. 2 enable the learner to specify example data elements, such as the example data elements depicted in the Education (e.g., Environmental) column 60 of FIG. 3, and view results, as follows: In the first process step, the learner uses the Context Selection Workspace (interface 12 of FIG. 4) to specify their query 61 as "Learn Lotus Notes at home." The learner may select the User Context "Remote Staffie", for example (where the icon's name is highlighted in FIG. 3), from among the available set of context icons 62. The learner may then elect to go to the Detail Specification Workspace (interface 22 of FIG. 5) in the second process step in order to view the context attributes 63 associated with the "Remote Staffie" User Context. Preferably, the default assigned context attribute value ("DSL", for example) for any context attribute ("Connectivity", for example) is visible on the context attribute icon ("Connectivity", for example, whose name is shown highlighted in FIG. 3). The learner may click on the context attribute "Connectivity" to see the menu of associated attribute values 64. The learner, for example, may select the "Disconnected" attribute value shown highlighted in FIG. 3. By double clicking on this attribute value the list of Value Resource Parameters, i.e., include/exclude filters 65, for the attribute value "Disconnected" is displayed. The learner, for example, may indicate that they want to include download and play resources and exclude online collaborative resources when searching for relevant resources. The learner may additionally specify resource priorities 66 by selecting, sequencing and weighting and specifying minimum and maximum values for relevant criteria such as cost, time, quality and risk on the Resource Selection Criteria Definition graphical user interface element on the Detail Specification Workspace (interface 22 of FIG. 5). In the third step of the process, the results of the learner's search are listed in the user view of the Results Display Workspace (interface 32 of FIG. 2). The learner may immediately select one or more of the listed education resources, request to see additional details on them, or request to see a response set graphic indicating the relative positioning of each resource along each of the axes (n-dimensions, relating to cost, time, quality and risk) specified earlier. If no acceptable education resources were provided, the learner may return to the Context Selection Workspace to redefine their query or select a different User Context such as "Commuting Techie" via the first interface. The learner may additionally elect to return to the Detail Specification Workspace of the second interface to change the default value of the context attribute "Connectivity" from Disconnected to Dial-up and add or remove Value Resource Parameters for the attribute value Dial-up or other context attribute values associated with context attributes such as "Learning Mode" or "Technical Field". The learner may also change their selection criteria, the weighting of the selection criteria, and the minimum/maximum values for any selection criteria, in hopes of identifying additional relevant resources.

With respect to the education domain, the user is a "learner" however, the three iconic workspaces of FIG. 2 provide the process for enabling the learner to specify example data elements, such as the example data elements depicted in the Education (e.g., Subject Matter) column 70 of FIG. 3, and view results, as follows: In the first process step, the learner uses the Context Selection Workspace (interface 12 of FIG. 4) to specify their query 71 as "Become a Linux developer by June" for example. The learner selects the User Context "Commuting Techie" from among the available context icons 72. The learner may elect to go to the Detail Specification Workspace in order to view the context attributes 73 associated with the "Commuting Techie" user context. Preferably, the default assigned context attribute value ("Programming", for example) for any context attribute ("Technical Field", for example) is visible on the context attribute icon ("Technical Field", for example, whose name is shown highlighted in FIG. 3). In addition, the learner may click on the context attribute ("Technical Field, to stay with the example) to display a pull down menu to view the other values 74 (in either picture or word format) that could be assigned to this attribute. The learner, for example, may select "Graphical Interfaces" shown highlighted in FIG. 3. By double clicking on this attribute value, the list of Value Resource Parameters (include/exclude filters 75) for the attribute value "Graphical Interfaces" will be displayed. For example, the learner may indicate that they want to include the KDE interface and exclude the GNOME interface when searching for relevant resources. The learner may additionally specify resource priorities 76 by selecting, sequencing and weighting and specifying minimum and maximum values for relevant criteria such as cost, time, quality and risk on the Resource Selection Criteria Definition graphical user interface element on the Detail Specification Workspace. The results of the learner's search are listed on the Results Display Workspace via the interface 32. The learner may immediately select one or more of the listed education resources, request to see additional details on them, or request to see a response set graphic indicating the relative positioning of each resource along each of the axes (n-dimensions, relating to cost, time, quality and risk) specified earlier. If no acceptable education resources were provided, the learner may return to the Context Selection Workspace 13 via the first interface 12 to redefine their query or select a different user context such as "Traveling Consultant." The learner may also elect to return to the Detail Specification Workspace via the second interface 22 to change the default value of the context attribute "Technical Field" from Graphical Interfaces to Programming and add or remove Value Resource Parameters for the attribute value Programming or other context attribute values associated with context attributes such as "Learning Mode" or "Connectivity." The learner may also change their selection criteria, the weighting of the selection criteria, and the minimum/maximum values for any selection criteria, in hopes of identifying additional relevant resources.

With respect to the real-estate domain, the user is a real estate transactor (renter/buyer) and FIG. 3 depicts an example interaction with the system through the iconic interfaces (FIG. 2) included in the embodiment of the invention as applied to the real estate domain. The three iconic workspaces of FIG. 2 enable a real estate renter or buyer to specify example data elements, such as the example data elements depicted in the Real Estate column 80 of FIG. 3, and view results, as follows: In the first process step, the renter or buyer uses the Context Selection Workspace to specify their query 81 as "Find housing near new job by August." The renter or buyer selects the user context "Relocating Business Professional" from among the available context icons 82. The renter or buyer may elect to go to the Detail Specification Workspace in the second interface in order to view the context attributes 83 associated with the "Relocating Business Professional" user context. Preferably, the default assigned context attribute value ("Subcontract it all", for example) for any context attribute ("Maintenance Style", for example) is visible on the context attribute icon ("Maintenance Style", for example, whose name is shown highlighted in FIG. 3). In addition, the renter/buyer may click on the context attribute ("maintenance style, to stay with the example) to display a pull down menu to view the other values 84 (in either picture or word format) that could be assigned to this attribute. Upon renter or buyer double clicking on attribute value "Do-It-YourSelf-er", for example, the list of Value Resource Parameters (include/exclude filters 85) for the attribute value "Do-It-YourSelf-er" is displayed. For example, as shown in FIG. 3, the renter or buyer may indicate that they want to include walls, paint and lawn mowing and exclude plumbing, electrical and landscaping when searching for relevant resources. The renter or buyer may additionally specify resource priorities 86 by selecting, sequencing and weighting and specifying minimum and maximum values for relevant criteria such as cost, time, quality and risk on the Resource Selection Criteria Definition graphical user interface element on the Detail Specification Workspace. The results of the renter or buyer's search are listed on the Results Display Workspace of the third interface 32 in which the renter or buyer may immediately select one or more of the listed real estate resources, request to see additional details on them, or request to see a response set graphic indicating the relative positioning of each resource along each of the axes (n-dimensions, relating to cost, time, quality and risk) specified earlier. If no acceptable housing resources were provided, the renter or buyer may return to the Context Selection Workspace to redefine their query or select a different user context such as "Empty Nester." The renter or buyer can also elect to return to the Detail Specification Workspace to change the default value of the context attribute "Maintenance Style" from Do-It-Yourself-er to Subcontract It All, for example, and add or remove Value Resource Parameters for the attribute value "Subcontract It All" or other context attribute values associated with context attributes such as "Mode of Commute to Work/School" or "Mode of Housing." The real estate transactor may also change their selection criteria, the weighting of the selection criteria, and the minimum/maximum values for any selection criteria, in hopes of identifying additional relevant resources.

With respect to the travel domain, the user is a traveler and FIG. 3 depicts an example interaction with the customer self service system through the iconic interfaces (FIG. 2) included in the embodiment of the invention as applied to the travel domain. The three iconic workspaces of FIG. 2 enable a traveler to specify data elements, such as the example data elements depicted in the Travel column 90 of FIG. 3, and view results, as follows: In the first process step, the traveler uses the Context Selection Workspace to specify their query 91 such as "Plan a trip to Vermont in June", for example. The traveler may then select the User Context Icon "Single Mom with kids", for example, from among the available user context icons 132, (where the icon's name 92 is highlighted in FIG. 3). The traveler may then elect to go to the Detail Specification Workspace in order to view the context attributes 93 associated with the "Single Mom with Kids" user context. Preferably, the default assigned context attribute value ("Drive", for example) for any context attribute ("Mode of Transportation", for example) is visible on the context attribute icon ("Mode of Transportation", for example, whose name is shown highlighted in FIG. 3). In addition, the traveler may click on the context attribute ("mode of transportation ", to stay with the example) to display a pull down menu to view the other values 94 (in either picture or word format) that could be assigned to this attribute ("Fly" for example). The traveler selects "fly" as an alternative to "drive", as illustrated with highlighting in FIG. 3. By "overriding " this attribute value and double clicking on it, the list of Value Resource parameters (include/exclude filters 95) for the attribute value "Fly" is displayed. The traveler may indicate that he/she wants to include all major carriers and exclude prop planes and airlines with bad safety records when searching for relevant resources. The traveler may also specify resource priorities 96 by selecting, sequencing and weighting and specifying minimum and maximum values for relevant criteria such as cost, time, quality and risk on the Resource Selection Criteria Definition graphical user interface element on the Detail Specification Workspace. The results of the traveler's search are then displayed via the Results Display Workspace of the third iconic interface 32 of FIG. 2. The traveler may immediately select one or more of the listed travel resources, request to see additional details on them, or request to see a response set graphic indicating the relative positioning of each resource along each of the axes (n-dimensions, relating to cost, time, quality and risk) specified earlier. If no acceptable travel resources were provided, the traveler may return to the Context Selection Workspace in Step 1 to redefine their query or select a different user context such as "Swinging Singles." The traveler may also elect to return to the Detail Specification Workspace in Step 2 to change the default value of the context attribute "Mode of Transportation" from Fly to Train and add or remove Value Resource Parameters for the attribute value Train or other context attribute values associated with context attributes such as "Mode of Housing" or "Food Style". The traveler may also change their selection criteria, the weighting of the selection criteria, and the minimum/maximum values for any selection criteria, in hopes of identifying additional relevant resources.

Referring back to FIG. 1, the customer self service system implements an n-dimensional context vector 25', derived from the combination of user context and previous interaction with the system, to map specific contexts to specific resources. This increases the relevance of search results for a given user in their current context without requiring the user to explicitly train the system. Inferences and conclusions are made regarding both the individual user's preferred resource characteristics and those of a common set of users. These are used as input to the sub-processes described above and in greater detail in above-mentioned commonly-owned, co-pending U.S. patent application Ser. Nos. 09/778,135, and 09/778,139, to modify the iconic interfaces presented to each particular user for their subsequent search using the current invention as well as to modify the results that would be selected for presentation to the user via the interface described in Ser. No. 09/778,147 in response to an identical search. Over time, the system will improve in its ability to serve individual needs and evolve to an ability to suggest preferred answers to groups of users.

The overall system also uses a batch background process described in commonly-owned, co-pending U.S. patent application Ser. No. 09/879,454 to cluster user interaction records to assist in the identification of new user contexts which serves to improve the system over time.

While the prior art has made use of adaptive learning in information retrieval systems, the overall customer self service system for resource search and selection enables the use of a large, rich set of contextual attribute-value pairs, is focused on learning about the user/user groups rather than the resources/resource groups and is able to discover user group characteristics and apply them to individuals. Much of the prior art is focused on the discovery of database structure, the clustering of data within the resources, or discovering relevant taxonomy for resources but the current system discovers contexts and context attributes among users which can be used predictively. The customer self-service system of the invention uses a highly specialized and optimized combination of supervised and unsupervised logic along with both automated and semi-automated entry of learned results and is able to deliver higher value because contexts are used in a closed loop self improvement system; front end (entry) middle (search and display) and back end (results and user feedback) are integrated. Other systems apply machine learning at the front, middle, or back, but not integrated throughout. The current system identifies context classifications and functions, and applies them to individual users to reduce the burden of fully communicating their question and increasing the specificity and accuracy of a query's search parameters. The current system identifies and improves selection logic and identifies and improves response sets to common queries based upon a rich set of contextual variables. The current system additionally orders the response set, potentially further limiting it, and prepares the response set for display in a way that identifies the "best" resources for a particular user based upon the rich set of context variables. The display of the invention additionally illustrates the decision making characteristics of the alternatives presented.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A user context classifier for a customer self service system that performs resource search and selection, said system including a context attribute database comprising types of user contexts and one or more context attributes associated with each user context for processing by said system, and context attribute function database comprising functions for computing values for each context attribute, said classifier comprising a processing mechanism for receiving a user query and a context vector comprising data associating an interaction state with said user and including context that is a function of the user, and processing said query and context vector against data included in said context attribute database and context attribute function database for predicting a particular user context, wherein said classifier implements a supervised learning algorithm to predict user contexts and populates said user context vector with context parameters specifying a user interaction state for use in a subsequent resource search.

2. The user context classifier for a customer self service system as claimed in claim 1, wherein said processing mechanism includes mechanism for applying said functions to context for specifying said user interaction state including context that is a function of the user, said mechanism further annotating the user context vector with a set of context parameters for use in subsequent processing.

3. The user context classifier for a customer self service system as claimed in claim 1, further including mechanism for updating the context attribute value functions database with more enhanced functions.

4. The user context classifier for a customer self service system as claimed in claim 3, wherein said system further includes a user interaction database comprising data relating to past user queries entered into the system and associated user contexts for particular users, said mechanism for updating the attribute value functions database comprising mechanism for analyzing historical user interaction data from the user interaction database and learning how user context attribute values map to user context attribute functions, wherein said data from the user records database serves as a training set for supervised learning to enable continuous improvement of said functions in said context attribute function database.

5. The user context classifier for a customer self service system as claimed in claim 4, wherein said user interaction data includes data relating to previous system interactions, said data including user validated user contexts that were applicable during said prior system interactions, and the users responses relating to those interactions.

6. The user context classifier for a customer self service system as claimed in claim 4, wherein said updating mechanism provides additions and modifications to a set of context attribute functions resulting in increasing ability to predict derived contexts as functions of the raw contexts.

7. The user context classifier for a customer self service system as claimed in claim 5, wherein said previous system interaction data further includes prior transactions of a current user and prior transactions of other similar users, wherein common behaviors and acceptance criteria are determined for said updating said functions.

8. The user context classifier for a customer self service system as claimed in claim 7, wherein similar users comprise those users with shared organization, community or environmental characteristics.

9. The user context classifier for a customer self service system as claimed in claim 1, wherein said processing mechanism for receiving a user query and a context vector comprising data associating an interaction state with said user and including context that is a function of the user further includes user context including criteria beyond content.

10. The user context classifier for a customer self service system as claimed in claim 1, wherein said classifier further populates said user context vector with context parameters beyond content, for use in a subsequent resource search.

11. A method for classifying user contexts for a customer self service system that performs resource search and selection, said method comprising the steps of:
   a) receiving a user query and a context vector comprising data associating an interaction state with said user and including context that is a function of the user;
   b) processing said query and context vector against data included in a context attribute database comprising types of user contexts and one or more context attributes associated with each user context for processing by said system; and
   c) processing said query and context vector against data included in a context attribute function database comprising functions for computing values for each context attribute, wherein said processing steps b) and c)

includes implementing a supervised learning algorithm for predicting a particular user context and populating said user context vector with context parameters specifying a user interaction state for use in a subsequent resource search.

12. The method as claimed in claim 11, wherein said processing step c) further includes the step of applying said functions to context for specifying said user interaction state including context that is a function of the user, said populating step including annotating the user context vector with a set of context parameters for use in subsequent processing.

13. The method as claimed in claim 11, further including the step of updating the context attribute value functions database with more enhanced functions.

14. The method as claimed in claim 13, wherein said updating step includes the steps of:

analyzing historical user interaction data from a user interaction database comprising data relating to past user queries entered into the system and associated user contexts for particular users; and, mapping user context attribute values to user context attribute functions, said data from said user records database serving as a training set for supervised learning to enable continuous improvement of said functions in said context attribute function database.

15. The method as claimed in claim 14, wherein said user interaction data further includes data relating to previous system interactions, said data including user validated user contexts that were applicable during said prior system interactions, and the users responses relating to those interactions.

16. The method as claimed in claim 15, wherein said previous system interactions includes prior transactions of a current user and prior transactions of other similar users, said functions updating step including the step of determining common behaviors and acceptance criteria from said previous system interactions.

17. The method as claimed in claim 16, wherein said similar users comprise those users with shared organization, community or environmental characteristics.

18. The method as claimed in claim 16, wherein said updating step includes the steps of providing additions and modifications to a set of contest attribute functions resulting in increasing ability to predict derived contexts as functions of raw contexts.

19. The method as claimed in claim 11, wherein said step a) of receiving a user query and a context vector comprising data associating an interaction state with said user and including context that is a function of the user further includes user context including criteria beyond content.

20. The method as claimed in claim 11, wherein said step c) of populating said user context vector with context parameters includes populating said user context vector with context parameters specifying a user interaction state, including parameters beyond content, for use in a subsequent resource search.

21. A program storage device readable by machine, tangibly embodying a program of instructions executable by the machine to perform method steps for classifying user contexts for a customer self service system that performs resource search and selection, said method comprising the steps of;

a) receiving a user query and a context vector comprising data associating an interaction state with said user and including context that is a function of the user;

b) processing said query and context vector against data included in a context attribute database comprising types of user contexts and one or more context attributes associated with each user context for processing by said system; and c) processing said query and context vector against data included in a context attribute function database comprising functions for computing values for each context attribute, wherein said processing steps b) and c) includes implementing a supervised learning algorithm for predicting a particular user context and populating said user context vector with context parameters specifying a user interaction state for use in a subsequent resource search.

22. The program storage device readable by machine as claimed in claim 21, wherein said processing step c) further includes the step of applying said functions to context for specifying said user interaction state including context that is a function of the user, said populating step including annotating the user context vector with a set of context parameters for use in subsequent processing.

23. The program storage device readable by machine as claimed in claim 21, further including the step of updating the context attribute value functions database with more enhanced functions.

24. The program storage device readable by machine as claimed in claim 23, wherein said updating step includes the steps of:

analyzing historical user interaction data from a user interaction database comprising data relating to past user queries entered into the system and associated user contexts for particular users; and, mapping user context attribute values to user context attribute functions, said data from said user records database serving as a training set for supervised learning to enable continuous improvement of said functions in said context attribute function database.

25. The program storage device readable by machine as claimed in claim 24, wherein said user interaction data further includes data relating to previous system interactions, said data including user validated user contexts that were applicable during said prior system interactions, and the users responses relating to those interactions.

26. The program storage device readable by machine as claimed in claim 21, wherein said step a) of receiving a user query and a context vector comprising data associating an interaction state with said user and including context that is a function of the user further includes user context including criteria beyond content.

27. The program storage device readable by machine as claimed in claim 21, wherein said step c) of populating said user context vector with context parameters includes populating said user context vector with context parameters specifying a user interaction state, including parameters beyond content, for use in a subsequent resource search.

* * * * *

UNITED STATES PATENT AND TRADEMARK OFFICE
CERTIFICATE OF CORRECTION

PATENT NO. : 6,853,998 B2
DATED : February 8, 2005
INVENTOR(S) : Debra L. Beibsheimer et al.

It is certified that error appears in the above-identified patent and that said Letters Patent is hereby corrected as shown below:

Column 19,
Line 60, after "algorithm", add:

-- that receives historical user interaction data including data relating to past user queries entered into the system and associated user context for user, and learns how users context attribute values map to user context attribute functions to improve said context attribute functions, said classifier utilizing improved context attribute functions --

Column 20,
Line 7, "with more enhanced functions." should read -- with said improved functions. --
Line 7, claim 4 should read -- The user context classifier for a customer self service system as claim in Claim 3, wherein said system further includes a user interaction database comprising said data relating to past user entered into the system and associated user contexts for particular users, said data from the user interaction database serves as a training set for said supervised learning algorithm to enable continuous improvement of said functions in said context attribute function database. --

Column 21,
Line 1, after "algorithm", add:

-- for receiving historical user interaction data including data relating to past user queries entered into the system and associated user context for users, and learning how user context attribute values map to user context attribute functions for improving said context attribute functions, said classifier utilizing improved context attribute functions --

Line 14, "with more enhanced functions." should read -- with said improved functions. --
Line 57, claim 14 should read -- The method as claimed in claim 13, wherein said data from user interaction records serves as a training set for said supervised learning algorithm to enable continuous improvement of said functions in said context attribute function database. --

Line 62, "steps of;" should read -- steps of: --

UNITED STATES PATENT AND TRADEMARK OFFICE
CERTIFICATE OF CORRECTION

PATENT NO. : 6,853,998 B2
DATED : February 8, 2005
INVENTOR(S) : Debra L. Beibsheimer et al.

It is certified that error appears in the above-identified patent and that said Letters Patent is hereby corrected as shown below:

Column 22,
Line 14, after "algorithm", add:

-- for receiving historical user interaction data including data relating to past user queries entered into the system and associated user contexts for users, and learning how user context attribute values map to user context attribute functions for improving said context attribute functions, said classifier utilizing improved context attribute functions--

Line 29, "with more enhanced functions." should read -- with said improved functions. --
Line 30, claim 24 should read --The program storage device readable by machine as claimed in claim 23, wherein said data from user interaction records serves as a training set for said supervised learning algorithm to enable continuous improvement of said functions in said context attribute function database. --

Signed and Sealed this

Twelfth Day of July, 2005

JON W. DUDAS
*Director of the United States Patent and Trademark Office*